(12) United States Patent
Tabata (10) Patent No.: US 9,892,575 B2
(45) Date of Patent: Feb. 13, 2018

(54) VEHICLE OPENING-AND-CLOSING MEMBER LOCKING-AND-UNLOCKING APPARATUS

(71) Applicant: Aisin Seiki Kabushiki Kaisha, Kariya-shi (JP)

(72) Inventor: Takehiro Tabata, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/131,060

(22) Filed: Apr. 18, 2016

(65) Prior Publication Data
US 2017/0032596 A1 Feb. 2, 2017

(30) Foreign Application Priority Data
Jul. 30, 2015 (JP) .................. 2015-150936

(51) Int. Cl.
*G06F 7/00* (2006.01)
*G07C 9/00* (2006.01)
(Continued)

(52) U.S. Cl.
CPC ........ *G07C 9/00111* (2013.01); *B60R 25/246* (2013.01); *G07C 9/00309* (2013.01);
(Continued)

(58) Field of Classification Search
CPC ............ G07C 9/00309; G07C 2209/65; G07C 2009/00373; G07C 2009/00769;
(Continued)

(56) References Cited

U.S. PATENT DOCUMENTS 8,854,176 B2 * 10/2014 Zeine ..................... H02J 7/025
340/333
2012/0049791 A1 * 3/2012 Tanabe .................... H01Q 7/00
320/108
(Continued)

FOREIGN PATENT DOCUMENTS

JP 2002-295094 10/2002
JP 2014-17701 1/2014
(Continued)

*Primary Examiner* — Dionne H Pendleton
(74) *Attorney, Agent, or Firm* — Oblon, McClelland, Maier & Neustadt, L.L.P.

(57) ABSTRACT

A vehicle opening-and-closing member locking-and-unlocking apparatus includes: an antenna including a series resonance circuit having a resonance capacitor and an antenna coil connected in series and an impedance regulating resistance connected in parallel to the antenna coil, the resonance capacitor side being connected in parallel to a first connecting line, the antenna coil side being connected to a second connecting line, and the antenna transmitting authentication information for locking and unlocking a vehicle opening-and-closing member to a portable device by resonance with an antenna drive signal output from an ECU via the first and second connecting lines; a human detection IC detecting contact to a human detecting area on the vehicle opening-and-closing member by the user; and a rectifier circuit configured to AC/DC convert the antenna drive signal and supply the converted signal to the human detection IC.

6 Claims, 3 Drawing Sheets

(51) Int. Cl.
*B60R 25/24* (2013.01)
*H01Q 1/32* (2006.01)
*H01Q 7/00* (2006.01)

(52) U.S. Cl.
CPC ..... *G07C 9/00714* (2013.01); *G07C 9/00896* (2013.01); *H01Q 1/3241* (2013.01); *H01Q 7/00* (2013.01); *G07C 2009/00769* (2013.01); *G07C 2009/00793* (2013.01); *G07C 2209/65* (2013.01)

(58) Field of Classification Search
CPC ...... G07C 2009/00793; G07C 2209/63; G07C 9/00111; G07C 9/00944; G07C 9/00714; H02J 5/005; H02J 7/025; H02J 17/00; H02J 7/0021; H02J 7/007; B60R 25/10; B60R 16/023; E05B 81/77; E05B 85/10; H01Q 1/3241; H02M 7/5387; Y02B 70/1441
See application file for complete search history.

(56) References Cited

U.S. PATENT DOCUMENTS

2014/0015597 A1* 1/2014 Tabata ............... H03K 3/01
                                                327/517
2014/0077926 A1   3/2014 Leconte
2016/0371906 A1* 12/2016 Fujiyama ............. B60R 25/245

FOREIGN PATENT DOCUMENTS

JP          2014-506306      3/2014
JP            5589870        9/2014

* cited by examiner

VEHICLE OPENING-AND-CLOSING MEMBER LOCKING-AND-UNLOCKING APPARATUS

CROSS REFERENCE TO RELATED APPLICATIONS

This application is based on and claims priority under 35 U.S.C. § 119 to Japanese Patent Application 2015-150936, filed on Jul. 30, 2015, the entire contents of which are incorporated herein by reference.

TECHNICAL FIELD

This disclosure relates to a vehicle opening-and-closing member locking-and-unlocking apparatus configured to lock and unlock the vehicle opening-and-closing member such as a vehicle door by using a so-called smart key system.

BACKGROUND DISCUSSION

Nowadays, vehicles equipped with a so-called smart key system have spread through the market in response to requirements of convenience and safety. The smart key system is configured to exchange authentication information by radio between a portable device (smart key) carried by a user and a vehicle opening-and-closing member locking-and-unlocking apparatus when the user of a vehicle approaches or contacts the vehicle opening-and-closing member such as a vehicle door and to automatically lock and unlock the vehicle opening-and-closing member when the authentication information matches (for example, see JP 2002-295094A (Reference 1)).

The smart key system of the related art generally includes (1) an antenna for exchanging authentication information with a portable device carried by a user of a vehicle, (2) a human detection IC that detects contact to a human detecting area provided near a vehicle opening-and-closing member by the user, and (3) an ECU (Electronic Control Unit) that drives and controls the antenna and the human detection IC.

However, with the configuration of the related art as described above, a number of connecting lines are required for connecting components. Therefore, there arises a problem of increases in size and costs of the apparatus. For example, the configuration disclosed in Reference 1 requires at least six harnesses having a length of 5 to 8 m.

As the related art for solving the above-described problem, there is proposed an apparatus which is reduced in size and costs by integrating the antenna and the human detection IC in one vehicle-mounted apparatus and superimposing a direct current power source voltage for the human detection IC, a human detecting signal and an antenna drive signal on a single connecting line and transmitting the aforesaid superimposed signals through the corresponding connecting line (for example, see Japanese Patent No. 5589870 (Reference 2)).

In Reference 2, a plurality of connecting lines that connect the ECU and the vehicle-mounted apparatus are combined into two connecting lines; a first line and a second line, and the direct current power source voltage and the antenna drive signal are switchably output from the two connecting lines to avoid an increase of the maximum value of the signals superimposed on the first line. An antenna resonance voltage is used as a power source for the human detection IC so as to maintain a human detection function also when the antenna is driven and thus the direct current power source voltage is not supplied.

However, the related art has the following problems.

For example, in Reference 2, when the antenna is driven, the antenna resonance voltage is used as power supplied to the human detection IC instead of the antenna drive signal output from the ECU. However, the antenna resonance voltage, being a value obtained by multiplying the antenna drive signal by a Q value of the antenna, is a value significantly higher than a rating of the human detection IC.

Therefore, with the configuration disclosed in Reference 2, the Q value of the antenna needs to be lowered so as to comply with the rating of the human detection IC in order to prevent the antenna resonance voltage from exceeding the rating of the human detection IC. Consequently, an output from the antenna becomes insufficient, and thus arrangement of the antenna needs to be devised in order to compensate the insufficiency of the output, which causes a problem of an increase in size of the antenna.

In contrast, an impedance $Z_0 = j\omega L + 1/j\omega C$ of a series resonance circuit of the antenna becomes almost zero at a resonance frequency $\omega = 1/\sqrt{(LC)}$ that the antenna drive signal outputs. Therefore, a current generated by the antenna drive signal flows toward an antenna (20) instead of a human detection IC (24) when the antenna resonates, and thus cannot be used as power for the human detection IC (24).

Even though the rating of the human detection IC is increased so as to comply with the antenna resonance voltage instead of reducing the antenna resonance voltage, the human detection IC and peripheral circuits thereof need to have high ratings. Therefore, the problem of increases in size and costs of the apparatus still remains.

SUMMARY

Thus, a need exists for a compact and low-cost vehicle opening-and-closing member locking-and-unlocking apparatus which is not suspectable to the drawback mentioned above.

A vehicle opening-and-closing member locking-and-unlocking apparatus according to an aspect of this disclosure includes: an antenna including a series resonance circuit having a resonance capacitor and an antenna coil connected in series and an impedance regulating resistance connected in parallel to the antenna coil, the resonance capacitor side being connected to a first connecting line, the antenna coil side being connected to a second connecting line, and the antenna transmitting authentication information for locking and unlocking a vehicle opening-and-closing member to a portable device carried by a user of the vehicle by resonance with the antenna drive signal output from an ECU via the first connecting line and the second connecting line; a human detection IC configured to detect contact to a human detecting area on the vehicle opening-and-closing member by the user by operating with the antenna drive signal as a power source when the antenna is driven and thus a direct current power source voltage is not supplied from the ECU via the first connecting line; and a rectifier circuit configured to AC/DC convert the antenna drive signal and supply the converted signal to the human detection IC.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Exemplary embodiments for implementing this disclosure will be described in detail with reference to the drawings. Dimensions, materials, shapes, relative positions among components described embodiments given below are optional and may be modified according to the structure of the apparatus and various conditions to which this disclosure is applied. Unless otherwise specifically noted, the scope of this disclosure is not limited to modes described in the embodiments described below. In the drawings which will be described below, same components having the same functions are denoted by the same reference numerals, and repeated descriptions may be omitted.

Embodiment 1

Figure 1:
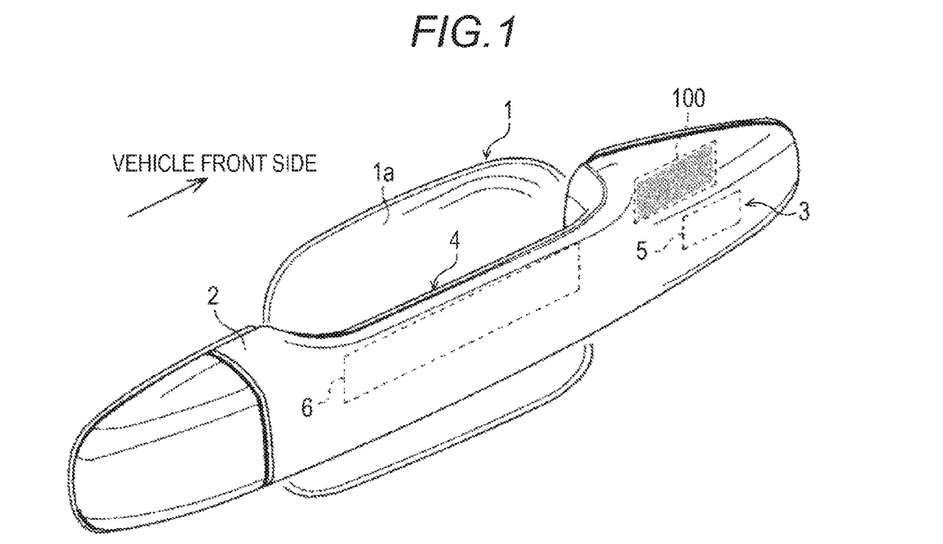
FIG. 1 is a perspective view of a vehicle opening-and-closing member locking-and-unlocking apparatus of Embodiment 1 disclosed here and is a schematic drawing illustrating an example of a case where a vehicle door is used as a vehicle opening-and-closing member.

FIG. 1 is a perspective view of a vehicle opening-and-closing member locking-and-unlocking apparatus 100 of Embodiment 1 disclosed here and is a schematic drawing illustrating an example of a case where a vehicle door is used as a vehicle opening-and-closing member.

The vehicle opening-and-closing member of Embodiment 1 is not limited to the vehicle door illustrated in FIG. 1, and includes, for example, a lid of a vehicle rear trunk, a lid of a vehicle front hood, a lid of an oil feeding plug, and the like. In the following description, the vehicle opening-and-closing member locking-and-unlocking apparatus 100, which is assumed to be the vehicle door, will be described with reference to FIG. 1.

As illustrated in FIG. 1, a door handle 2 of the vehicle door is installed outside a door panel 1, which constitutes part of the vehicle door, so as to extend in a fore-and-aft direction of a vehicle. The door handle 2 is attached to the door panel 1 at two positions; front and rear.

The door handle 2 is formed into a hollow shape having an inner space by, for example, resin molding. The door panel 1 is provided with a depression 1a at a position opposing the door handle 2 to allow a human hand to easily grip the door handle 2 near the center thereof as illustrated in FIG. 1.

An unlocking area 4 for unlocking the vehicle door and a locking area 3 for locking the vehicle door are provided on an outer peripheral surface of the door handle 2 as a human detecting area for detecting contact thereto by a user of the vehicle.

For example, in FIG. 1, the unlocking area 4 is provided on a grip portion of the door handle 2 along an electrostatic capacitance type unlock sensor electrode 6 mounted in the door handle 2. The locking area 3 is provided on the vehicle front side with respect to the unlocking area 4 along an electrostatic capacitance type lock sensor electrode 5 mounted in the door handle 2. The locking area 3 may be provided on a vehicle rear side with respect to the unlocking area 4.

The vehicle opening-and-closing member locking-and-unlocking apparatus 100 is electrically connected to the lock sensor electrode 5 and the unlock sensor electrode 6 and is mounted in the interior of the door handle 2.

The vehicle opening-and-closing member locking-and-unlocking apparatus 100 is controlled by an ECU (see FIG. 2 described later) outside the door handle 2. When a user of the vehicle contacts the locking area 3, the vehicle opening-and-closing member locking-and-unlocking apparatus 100 detects the contact on the basis of a capacitance change of the lock sensor electrode 5, and the ECU brings the door handle 2 into a locked or a lockable state. When the user of the vehicle contacts the unlocking area 4, the contact is detected on the basis of a capacitance change of the unlock sensor electrode 6, and the ECU brings the door handle 2 into an unlocked or an unlockable state.

The lock sensor electrode 5 and the unlock sensor electrode 6 are not limited to be the electrostatic capacitance type and, for example, a pressure sensor, an infrared ray sensor, or a proximity sensor such as a radio frequency identifier (RFID) is also applicable. In FIG. 1, the lock sensor electrode 5 and the unlock sensor electrode 6 have a substantially rectangular strip shape, and the unlock sensor electrode 6 is larger than the lock sensor electrode 5. However, Embodiment 1 is not limited to have such a configuration.

Both of the lock sensor electrode 5 and the unlock sensor electrode 6 do not necessarily have to be provided, and a configuration having only one of these electrodes is also applicable.

Figure 2:
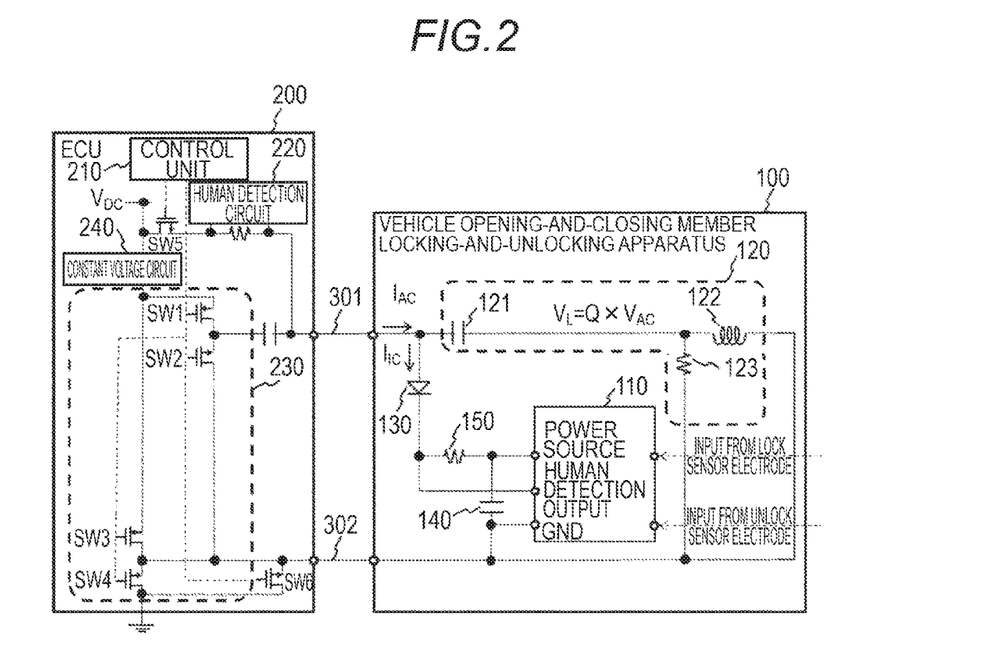
FIG. 2 is a schematic drawing illustrating a circuit configuration of the vehicle opening-and-closing member locking-and-unlocking apparatus of Embodiment 1 disclosed here together with an ECU.

FIG. 2 is a schematic drawing illustrating a circuit configuration of the vehicle opening-and-closing member locking-and-unlocking apparatus 100 of Embodiment 1 disclosed here together with an ECU 200. Referring now to FIG. 2, a configuration and an operation of the vehicle opening-and-closing member locking-and-unlocking apparatus 100 of Embodiment 1 will be described.

The vehicle opening-and-closing member locking-and-unlocking apparatus 100 is mounted near the vehicle opening-and-closing member. For example, in FIG. 1, the vehicle opening-and-closing member locking-and-unlocking apparatus 100 is mounted in the interior of the door handle 2. In contrast, since the ECU 200 concurrently performs control of functions other than locking-and-unlocking of the vehicle opening-and-closing member, the ECU 200 is often installed at a position away from the vehicle opening-and-closing member. However, the ECU 200 may also be installed in the vicinity of the vehicle opening-and-closing member. The vehicle opening-and-closing member locking-and-unlocking apparatus 100 and the ECU 200 are electrically connected to each other by a first connecting line 301 and a second connecting line 302.

The vehicle opening-and-closing member locking-and-unlocking apparatus 100 includes a human detection IC 110, an antenna 120, a rectifier diode 130, and a smoothing capacitor 140. The ECU 200 includes a control unit 210, a human detection circuit 220, an antenna driving circuit 230, and a constant voltage circuit 240.

Table 1 is a logical value table indicating ON/OFF state of SW1 to SW6 assumed when the ECU 200 of Embodiment 1 disclosed here controls switching of an output signal. For example, a transistor element such as an FET (Field Effect Transistor) may be used as switches SW1 to SW6. The switch SW6 may be shared with the switch SW4.

TABLE 1

|  |  | SW1 | SW2 | SW3 | SW4 | SW5 | SW6 |
|---|---|---|---|---|---|---|---|
| When antenna is not driven | | | OFF | | | ON | ON |
| When antenna is driven | STATE 1 | ON | OFF | OFF | ON | OFF | OFF |
| | STATE 2 | OFF | ON | ON | OFF | | |

The control unit 210 of the ECU 200 turns the switches SW1 to SW4 of the ECU 200 to OFF state and turns the switches SW5 and SW6 to ON state in accordance with the logical value table shown in Table 1 when the antenna is not driven. Consequently, a direct current power source voltage $V_{DC}$ is supplied to the human detection IC 110 via the first connecting line 301. At this time, the second connecting line 302 is used as a reference line with respect to the first connecting line 301.

When the lock sensor electrode and the unlock sensor electrode detect contact to the human detecting area on the vehicle opening-and-closing member by a user of the vehicle, the human detection IC 110 superimposes a human detecting signal on the first connecting line 301 and outputs the corresponding signal to the ECU 200.

A specific method of superimposing the human detecting signal on the first connecting line 301 may include, for example, providing switching means and a resistive element in the interior of the human detection IC 110 and dropping the direct current power source voltage $V_{DC}$ for a certain period. In this case, lock and unlock can be recognized by a difference in magnitude of the voltage drop or by a length of a voltage drop period.

When the human detection circuit 220 detects the human detecting signal superimposed on the first connecting line 301, the control unit 210 switches the signal output from the ECU 200 from the direct current power source voltage $V_{DC}$ to an antenna drive signal $V_{AC}$.

Specifically, the control unit 210 turns the switch SW5 and the switch SW6 to OFF state and performs switching control of the switches SW1 to SW4 of the antenna driving circuit 230 to State 1 and State 2 in a resonance period of the antenna 120 in accordance with the logical value table shown in Table 1. Consequently, the direct current power source voltage $V_{DC}$ stepped up and down by the constant voltage circuit 240 is DC/AC converted, and is output to the antenna 120 as the antenna drive signal $V_{AC}$ via the first connecting line 301 and the second connecting line 302.

At this time, the human detection IC 110 uses the antenna drive signal $V_{AC}$ as the power source so as to continue a human detection function even when the antenna is driven and thus the direct current power source voltage $V_{DC}$ is not supplied. The rectifier diode 130, the smoothing capacitor 140, and a protective resistance 150 illustrated in FIG. 2 constitute a rectifier circuit for AC/DC conversion of the antenna drive signal $V_{AC}$.

An anode of the rectifier diode 130 is connected to the first connecting line 301, and a cathode of the rectifier diode 130 is connected to a power source terminal of the human detection IC 110 via the protective resistance 150. One end of the smoothing capacitor 140 is connected to the power source terminal of the human detection IC 110, and the other end of the smoothing capacitor 140 is connected to a GND terminal of the human detection IC 110. The protective resistance 150 may be provided in the human detection IC 110.

Accordingly, the antenna drive signal $V_{AC}$ is rectified by the rectifier diode 130 and is smoothened by the smoothing capacitor 140, and electric power is supplied to the human detection IC 110. Therefore, the human detection IC 110 is allowed to continue the human detection function even when the antenna is driven.

The antenna 120 is provided with a series resonance circuit including a resonance capacitor 121 and an antenna coil 122 connected in series. The resonance capacitor 121 side of the antenna 120 is connected to the first connecting line 301, and the antenna coil 122 side of the antenna 120 is connected to the second connecting line 302.

Here, an impedance $Z_0$ of the series resonance circuit is expressed by the following expression (1):

$$Z_0 = j\omega L + 1/j\omega C \qquad (1)$$
$$= (1 - \omega^2 LC)/j\omega C,$$

where C is a capacitance value of the resonance capacitor 121, L is an inductance value of the antenna coil 122, and $\omega$ is a frequency of the antenna drive signal $V_{AC}$.

However, the impedance $Z_0$ expressed by the expression (1) given above becomes zero logically when the antenna 120 is driven by the antenna drive signal $V_{AC}$ and resonates at a resonance frequency $\omega=1/\sqrt{(LC)}$.

Therefore, when the antenna resonates, a current which can be supplied from the ECU 200 flows toward the antenna 120 instead of the human detection IC 110 and thus a current generated by the antenna drive signal $V_{AC}$ cannot be taken into the human detection IC 110.

The antenna 120 of Embodiment 1 further includes an impedance regulating resistance 123 connected in parallel to the antenna coil 122. An impedance $Z_1$ of the antenna 120 of Embodiment 1 is expressed by the following expression (2):

$$Z_1 = j\omega L + (R \times 1/j\omega C)/(R + 1/j\omega C) \qquad (2)$$

where R is a resistance value of the impedance regulating resistance 123.

Accordingly, in Embodiment 1, the impedance $Z_1$ of the antenna 120 does not become zero logically even at the frequency $\omega=1/\sqrt{(LC)}$ when the antenna resonates. Therefore, a current generated by the antenna drive signal $V_{AC}$ that the ECU 200 outputs may be used as power to the human detection IC 110.

The antenna 120 resonates with the antenna drive signal $V_{AC}$ output from the ECU 200 via the first connecting line 301 and the second connecting line 302 to exchange authentication information for locking and unlocking the vehicle opening-and-closing member by radio with the portable device (smart key) carried by the user of the vehicle. A known technology may be used for modulating the authentication information to the antenna drive signal $V_{AC}$. A configuration of providing the antenna 120 only with a transmitting function which needs to be driven, and mounting a receiving antenna separately is also applicable.

When the authentication information output from the portable device carried by the user is authenticated, the control unit 210 turns the switches SW1 to SW4 of the ECU 200 to OFF state and turns the switches SW5 and SW6 to ON state in accordance with the logical value table shown in Table 1 to switch a signal output from the ECU 200 again from the antenna drive signal $V_{AC}$ to the direct current power source voltage $V_{DC}$.

The control unit 210 controls the human detection IC 110 to lock and unlock the door handle 2 or to bring the door handle 2 into a potentially lockable or unlockable state. For example, the method employed in the case of the human detecting signal described above may be employed also as a communication method between the control unit 210 and the human detection IC 110.

In this manner, the vehicle opening-and-closing member locking-and-unlocking apparatus 100 of Embodiment 1 is characterized by having the impedance regulating resistance 123 connected in parallel to the antenna coil 122. Consequently, the impedance $Z_1$ of the antenna 120 does not become zero logically even when the antenna resonates.

A current $I_{IC}$ supplied to the human detection IC 110 is expressed by the following expression (3):

$$I_{IC}=Z_1/(Z_1+Z_{IC})\times I_{AC} \qquad (3)$$

where $I_{AC}$ is a current value that the ECU 200 can supply with the antenna drive signal $V_{AC}$, and $Z_{IC}$ is an impedance of the human detection IC 110 including a rectifier circuit.

A power $W_{IC}$ supplied to the human detection IC 110 is expressed by the following expression (4):

$$W_{IC}=I_{IC}\times V_{AC} \qquad (4).$$

Therefore, according to the expressions (2) to (4) given above, the resistance value of the impedance regulating resistance 123 is determined so that the power $W_{IC}$ required for the human detection IC 110 is supplied to the human detection IC 110. Consequently, a current generated by the antenna drive signal $V_{AC}$ can be used as power to the human detection IC 110.

Normally, the resistance value R of the impedance regulating resistance 123 determined in this manner is significantly larger than the reactance value L of the antenna coil 122, and thus the Q value of the antenna is less affected. With a high level of the resistance value R of the impedance regulating resistance 123, power consumed by the impedance regulating resistance 123 is also reduced.

In particular, the vehicle opening-and-closing member locking-and-unlocking apparatus 100 of Embodiment 1 has the following advantageous effects compared with those of Reference 2.

Firstly, in Reference 2, a significantly large antenna resonance voltage $V_L=Q\times V_{AC}$ is used as the power source for the human detection IC 110. Therefore, the Q value of the antenna needs to be controlled so as to comply with the rating of the human detection IC 110, so that the antenna resonance voltage $V_L$ does not exceed the rating of the human detection IC 110. For example, in a case where the rating of the human detection IC 110 is set to N times the antenna drive signal $V_{AC}$, the Q value of the antenna is limited to N at maximum. Therefore, when using the antenna 120 having a high Q value, the Q value of the antenna is significantly reduced with the configuration disclosed in Reference 2.

In contrast, in Embodiment 1, the antenna drive signal $V_{AC}$ which can be output independently from the Q value of the antenna is used as the power source for the human detection IC 110 instead of the antenna resonance voltage $V_L=Q\times V_{AC}$. Therefore, the antenna may have a higher Q value. Accordingly, in Embodiment 1, the apparatus can be simplified and reduced in size by using the antenna 120 having a high Q value.

In Embodiment 1, although the provision of the impedance regulating resistance 123 lowers the Q value of the antenna 120, the effect is insignificant as described above. In addition, since the antenna 120 having a higher Q value can be used or the output of the antenna drive signal $V_{AC}$ can be increased in Embodiment 1, the aforesaid lowering of the Q value of the antenna can easily be compensated.

As a second advantage, a connecting element such as a diode for supplying the antenna resonance voltage $V_L$ from the series resonance circuit to the human detection IC needs to be newly added in Reference 2, and the connecting element having a high rating needs to be used. However, in Embodiment 1, only the impedance regulating resistance 123 for adjusting an impedance of the antenna 120 is added in parallel to the antenna coil 122, and thus a reduction in costs of the apparatus is easily achieved compared with Reference 2.

As described thus far, the configuration of Embodiment 1 includes the impedance regulating resistance connected in parallel to the antenna coil. Accordingly, even when the antenna resonates, since the impedance of the antenna does not become zero logically and a current generated by the antenna drive signal output from the ECU can be used as an electric power for the human detection IC.

Consequently, the compact and low-cost vehicle opening-and-closing member locking-and-unlocking apparatus allowed to continue the human detection function by using the antenna drive signal, the output of which is not limited by the Q value of the antenna, as the power source even when the antenna is driven and the direct current power source voltage is not supplied is provided.

Embodiment 2

Figure 3:
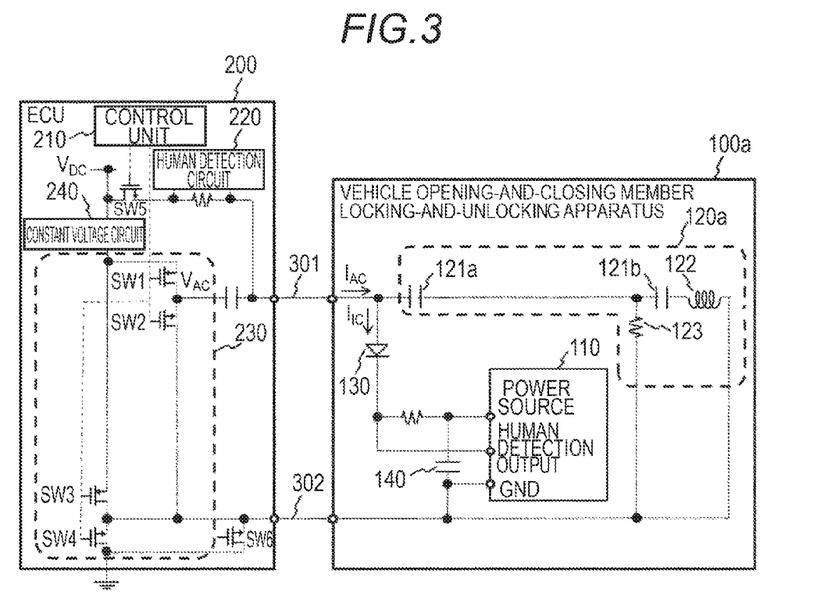
FIG. 3 is a first schematic drawing illustrating a circuit configuration of a vehicle opening-and-closing member locking-and-unlocking apparatus of Embodiment 2 disclosed here together with the ECU.
Figure 4:
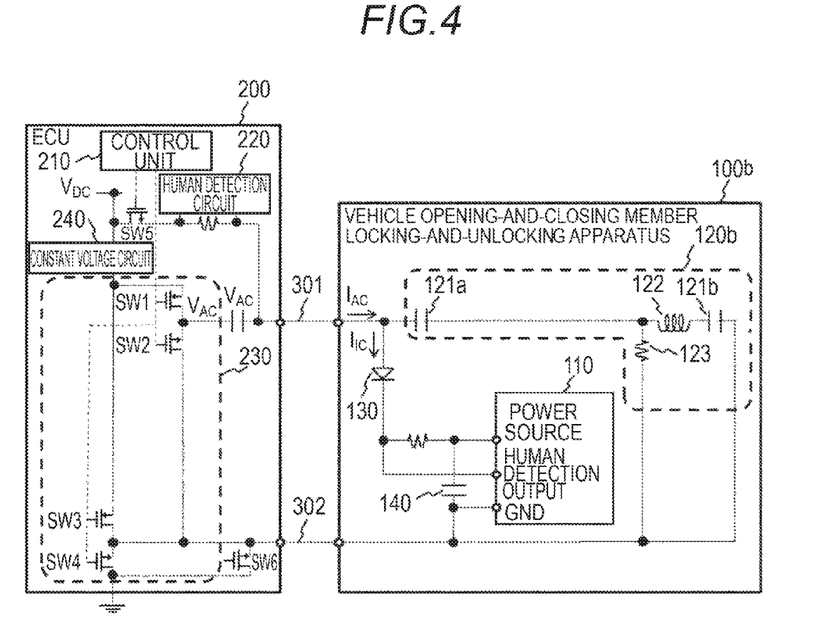
FIG. 4 is a second schematic drawing illustrating a circuit configuration of a vehicle opening-and-closing member locking-and-unlocking apparatus of Embodiment 2 disclosed here together with the ECU.

FIG. 3 is a first schematic drawing illustrating a circuit configuration of a vehicle opening-and-closing member locking-and-unlocking apparatus 100a of Embodiment 2 disclosed here together with the ECU 200. FIG. 4 is a second schematic drawing illustrating a circuit configuration of a vehicle opening-and-closing member locking-and-unlocking apparatus 100b of Embodiment 2 disclosed here together with the ECU 200.

The vehicle opening-and-closing member locking-and-unlocking apparatuses 100a and 100b of Embodiment 2 illustrated in FIG. 3 and FIG. 4 are different from the vehicle opening-and-closing member locking-and-unlocking apparatus 100 of Embodiment 1 described above and illustrated in FIG. 2 in that the resonance capacitor 121 of antennas 120a and 120b is divided into two parts; a first resonance capacitor 121a and a second resonance capacitor 121b.

Embodiment 2 is also different from Embodiment 1 in that the impedance regulating resistance 123 is connected in parallel to the second resonance capacitor 121b and the antenna coil 122 connected in series to each other. Other configurations and operations are the same as those of Embodiment 1 described above, and thus will not be described again.

The antenna 120a of Embodiment 2 illustrated in FIG. 3 is connected to the first resonance capacitor 121a, the second resonance capacitor 121b, and the antenna coil 122 in series in this order. In other words, one end of the first resonance capacitor 121a is connected to the first connecting line 301, the other end of the first resonance capacitor 121a is connected to one end of the second resonance capacitor 121b, the other end of the second resonance capacitor 121b is connected to one end of the antenna coil 122, and the other end of the antenna coil 122 is connected to the second connecting line 302.

The antenna 120b of Embodiment 2 illustrated in FIG. 4 is connected to the first resonance capacitor 121a, the antenna coil 122, and the second resonance capacitor 121b in series in this order. In other words, one end of the first resonance capacitor 121a is connected to the first connecting line 301, the other end of the first resonance capacitor 121a is connected to one end of the antenna coil 122, the other end of the antenna coil 122 is connected to one end of the second resonance capacitor 121b, and the other end of the second resonance capacitor 121b is connected to the second connecting line 302.

With the configuration of Embodiment 2 described above as well, the impedance $Z_0$ of the series resonance circuit except for the impedance regulating resistance 123 of the antenna 120 becomes the same as that of the expression (1) given above. Therefore, according to the same consideration as that of Embodiment 1 described above, the impedance regulating resistance 123 is connected in parallel to the second resonance capacitor 121b and the antenna coil 122, so that the impedance $Z_1$ of the antenna 120 does not become zero logically even at a frequency $\omega=1/\sqrt{(LC)}$ of the series resonance circuit.

As described thus far, of Embodiment 2, even when the circuit configuration of the antenna 120 is different from that of Embodiment 1, if the impedance $Z_0$ of the series resonance circuit except for the impedance regulating resistance 123 is equivalent, the same effect as that of Embodiment 1 described above is obtained by connecting the impedance regulating resistance 123 in parallel to part of the series resonance circuit.

Embodiment 3

Figure 5:
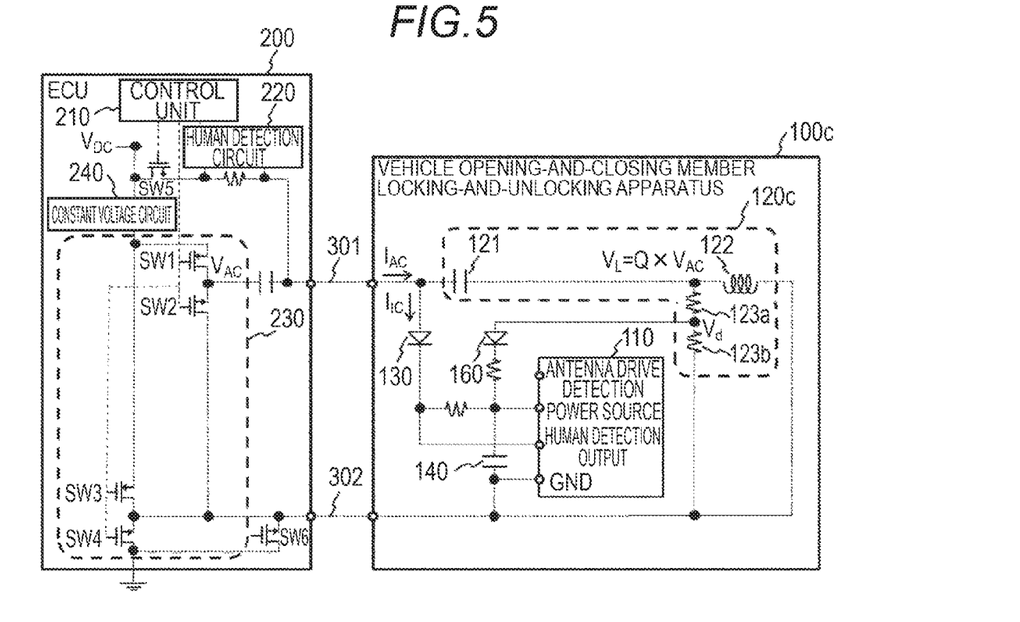
FIG. 5 is a schematic drawing illustrating a circuit configuration of a vehicle opening-and-closing member locking-and-unlocking apparatus of Embodiment 3 disclosed here together with the ECU.

FIG. 5 is a schematic drawing illustrating a circuit configuration of a vehicle opening-and-closing member locking-and-unlocking apparatus 100c of Embodiment 3 disclosed here together with the ECU 200. The vehicle opening-and-closing member locking-and-unlocking apparatus 100c of Embodiment 3 illustrated in FIG. 5 is different from the vehicle opening-and-closing member locking-and-unlocking apparatus 100 of Embodiment 1 described above illustrated in FIG. 2 in that the impedance regulating resistance 123 of an antenna 120c is divided into two parts; a first voltage dividing resistance 123a and a second voltage dividing resistance 123b.

The apparatus of Embodiment 3 is also different from that of Embodiment 1 in that a divided voltage $V_d$ of the antenna resonance voltage $V_L$ divided by a first voltage dividing resistance 123a and a second voltage dividing resistance 123b is supplied to the power source terminal of the human detection IC 110 via a voltage dividing rectifier diode 160. Other configurations and operations are the same as those of Embodiment 1 described above, and thus will not be described again.

An anode of the voltage dividing rectifier diode 160 illustrated in FIG. 5 is connected between the first voltage dividing resistance 123a and the second voltage dividing resistance 123b of the impedance regulating resistance 123, and a cathode of the voltage dividing rectifier diode 160 is connected to the power source terminal of the human detection IC 110.

A resistance provided between the power source terminal of the human detection IC 110 and the impedance regulating resistance 123 is a resistance for protecting the IC, and the protective resistance may be provided in the human detection IC 110.

As described above, the antenna resonance voltage $V_L=Q \times V_{AC}$ is significantly larger than the rating of the human detection IC, and is difficult to be used as power for the human detection IC 110 as-is. However, as illustrated in FIG. 5, the antenna resonance voltage $V_L$ may be used as power for the human detection IC 110 by being divided by using the first voltage dividing resistance 123a and the second voltage dividing resistance 123b.

The divided voltage $V_d$ is expressed by the following expression (5):

$$V_d = R2/(R1+R2) \times V_L \qquad (5)$$

where R is a resistance value of the impedance regulating resistance 123, R1 is a resistance value of the first voltage dividing resistance 123a, and R2 is a resistance value of the second voltage dividing resistance 123b and where R1+R2=R.

However, since the resistance value of the impedance regulating resistance 123 needs to be a large value so as to prevent lowering of the Q value of the antenna 120c, a current value which can be extracted via the impedance regulating resistance 123 is small. Therefore, the divided voltage $V_d$ may not be sufficient to be used as the power source for the human detection IC 110.

Therefore, in Embodiment 3, the divided voltage $V_d$ is used as auxiliary power for the human detection IC 110. Accordingly, since the antenna drive signal $V_{AC}$ and the divided voltage $V_d$ can be concurrently used as the power source for the human detection IC 110 when the antenna is driven, a surplus power may be prepared for the human detection IC 110.

Alternatively, the lowering of the Q value of the antenna 120 may be reduced more by increasing the resistance value of the impedance regulating resistance 123 by an amount corresponding to the surplus of the power to be supplied to the human detection IC 110 and bringing the impedance $Z_1$ of the antenna 120 closer to the impedance $Z_0$ of the series resonance circuit by.

In addition, in Embodiment 3, the existing impedance regulating resistance 123 is divided into the first voltage dividing resistance 123a and the second voltage dividing resistance 123b for dividing the antenna resonance voltage $V_L$. Therefore, a resistance for dividing voltage does not have to be added, and thus decreased in size and costs of the apparatus are achieved.

As described above, in Embodiment 3, the impedance regulating resistance is divided into the first voltage dividing resistance and the second voltage dividing resistance, and the divided voltage obtained by dividing the antenna resonance voltage by the first voltage dividing resistance and the second voltage dividing resistance is output to the power source terminal of the human detection IC via the voltage dividing rectifier diode. Consequently, the compact and low-cost vehicle opening-and-closing member locking-and-unlocking apparatus capable of providing a surplus power to be supplied to the human detection IC and capable of reducing lowering of the Q value of the antenna due to the provision of the impedance regulating resistance is provided.

Embodiment 4

Figure 6:
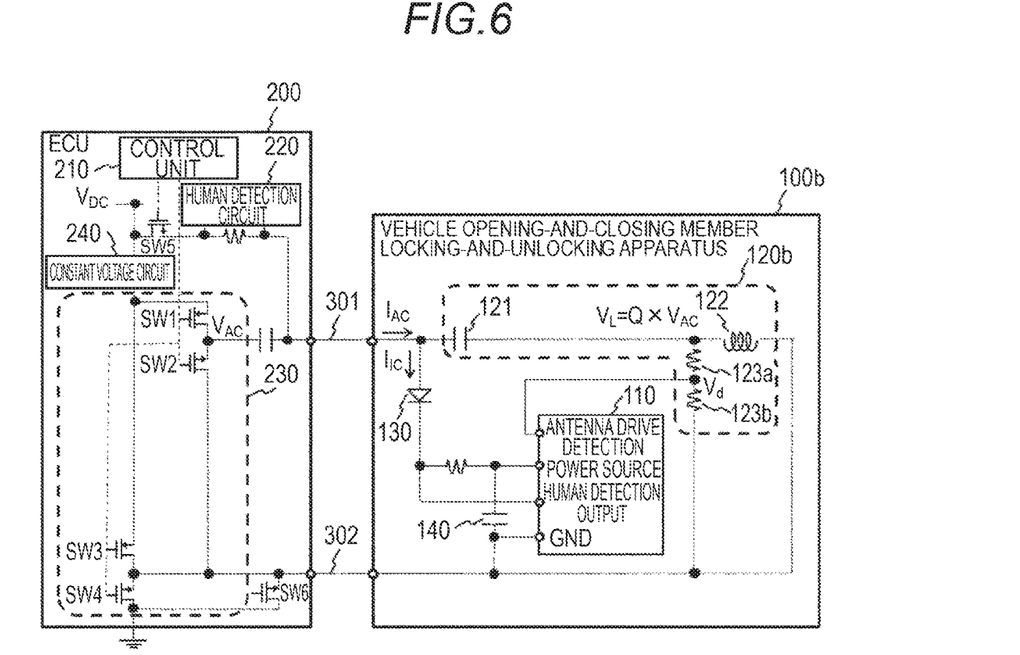
FIG. 6 is a schematic drawing illustrating a circuit configuration of a vehicle opening-and-closing member locking-and-unlocking apparatus of Embodiment 4 disclosed here together with the ECU.

FIG. 6 is a schematic drawing illustrating a circuit configuration of a vehicle opening-and-closing member locking-and-unlocking apparatus 100*d* of Embodiment 4 disclosed here together with the ECU 200. The vehicle opening-and-closing member locking-and-unlocking apparatus 100*d* of Embodiment 4 illustrated in FIG. 6 is different from the vehicle opening-and-closing member locking-and-unlocking apparatus 100 of Embodiment 1 described above illustrated in FIG. 2 in that the impedance regulating resistance 123 of an antenna 120*d* is divided into two parts; the first voltage dividing resistance 123*a* and the second voltage dividing resistance 123*b*.

The apparatus of Embodiment 4 is also different from that of Embodiment 1 in that the divided voltage $V_d$ of the antenna resonance voltage $V_L$ divided by the first voltage dividing resistance 123*a* and the second voltage dividing resistance 123*b* is output to the antenna drive detection terminal of the human detection IC 110. Other configurations and operations are the same as those of Embodiment 1 described above, and thus will not be described again.

According to the configuration of Embodiment 4 as described above, the antenna resonance voltage $V_L$ is divided by using the first voltage dividing resistance 123*a* and the second voltage dividing resistance 123*b* and then is output to the antenna drive detection terminal of the human detection IC 110. Therefore, a driving state of the antenna 120*d* can be detected without using the human detection IC 110 and the peripheral circuit having a high rating.

As described above, in Embodiment 4, the impedance regulating resistance is divided into the first voltage dividing resistance and the second voltage dividing resistance, and the divided voltage obtained by dividing the antenna resonance voltage by the first voltage dividing resistance and the second voltage dividing resistance is output to the antenna drive detection terminal of the human detection IC. Consequently, since the driving state of the antenna can be detected without increasing the rating of the human detection IC and the peripheral circuit, a compact and low-cost vehicle opening-and-closing member locking-and-unlocking apparatus is obtained.

A vehicle opening-and-closing member locking-and-unlocking apparatus according to an aspect of this disclosure includes: an antenna including a series resonance circuit having a resonance capacitor and an antenna coil connected in series and an impedance regulating resistance connected in parallel to the antenna coil, the resonance capacitor side being connected to a first connecting line, the antenna coil side being connected to a second connecting line, and the antenna transmitting authentication information for locking and unlocking a vehicle opening-and-closing member to a portable device carried by a user of the vehicle by resonance with the antenna drive signal output from an ECU via the first connecting line and the second connecting line; a human detection IC configured to detect contact to a human detecting area on the vehicle opening-and-closing member by the user by operating with the antenna drive signal as a power source when the antenna is driven and thus a direct current power source voltage is not supplied from the ECU via the first connecting line; and a rectifier circuit configured to AC/DC convert the antenna drive signal and supply the converted signal to the human detection IC.

According to the aspect of this disclosure, the impedance regulating resistance is connected in parallel to the antenna coil. Accordingly, since impedance of the antenna does not become zero logically even when the antenna resonates, a current generated by the antenna drive signal output from the ECU can be used as an electric power for the human detection IC.

Consequently, the compact and low-cost vehicle opening-and-closing member locking-and-unlocking apparatus allowed to continue the human detection function by using the antenna drive signal, the output of which is not limited by a Q value of an antenna, as a power source even when the antenna is driven and thus the direct current power source voltage is not supplied is provided.

In the vehicle opening-and-closing member locking-and-unlocking apparatus according to the aspect of this disclosure, the impedance regulating resistance may be divided into a first voltage dividing resistance and a second voltage dividing resistance, and the divided voltage obtained by dividing the antenna resonance voltage with the first voltage dividing resistance and the second voltage dividing resistance may be output to a power source terminal of the human detection IC via a voltage dividing rectifier diode, and an anode of the voltage dividing rectifier diode may be connected between the first voltage dividing resistance and the second voltage dividing resistance of the impedance regulating resistance, and a cathode of the voltage dividing rectifier diode is connected to the power source terminal of the human detection IC.

In the vehicle opening-and-closing member locking-and-unlocking apparatus according to the aspect of this disclosure, the impedance regulating resistance may be divided into the first voltage dividing resistance and the second voltage dividing resistance, and the divided voltage obtained by dividing the antenna resonance voltage with the first voltage dividing resistance and the second voltage dividing resistance may be output to an antenna drive detection terminal of the human detection IC, and the human detection IC may detect a driving state of the antenna on the basis of a value of the divided voltage.

In the vehicle opening-and-closing member locking-and-unlocking apparatus according to any one of the aspect of this disclosure, the resonance capacitor of the antenna may be divided into a first resonance capacitor and a second resonance capacitor, one end of the first resonance capacitor may be connected to the first connecting line, the other end of the first resonance capacitor may be connected to one end of the second resonance capacitor, the other end of the second resonance capacitor may be connected to one end of the antenna coil, and the other end of the antenna coil may be connected to the second connecting line, and the impedance regulating resistance may be connected in parallel to the second resonance capacitor and the antenna coil connected in series to each other.

In the vehicle opening-and-closing member locking-and-unlocking apparatus according to any one of the aspect of this disclosure, the resonance capacitor of the antenna may be divided into the first resonance capacitor and the second resonance capacitor, one end of the first resonance capacitor may be connected to the first connecting line, the other end of the first resonance capacitor may be connected to one end of the antenna coil, the other end of the antenna coil is connected to one end of the second resonance capacitor, and the other end of the second resonance capacitor may be connected to the second connecting line, and the impedance regulating resistance may be connected in parallel to the second resonance capacitor and the antenna coil connected in series to each other.

In the vehicle opening-and-closing member locking-and-unlocking apparatus according to any one of the aspect of this disclosure, a resistance value R of the impedance regulating resistance may be determined to satisfy the following relationship:

$$Z_1=j\omega L+(R\times 1/j\omega C)/(R+1/j\omega C) I_{IC}=Z_1/(Z_1+Z_{IC})\times I_{AC}$$
$$W_{IC}=I_{IC}\times V_{AC}$$

where $Z_{IC}$ is an impedance value of the human detection IC including the rectifier circuit, C is a capacitance value of the resonance capacitor, L is an inductance value of the antenna coil, ω is a frequency of the antenna drive signal, $V_{AC}$ is a voltage value of the antenna drive signal, and $I_{AC}$ is a current value of the antenna drive signal so that a power value $W_{IC}$ required by the human detection IC is supplied to the human detection IC.

In the vehicle opening-and-closing member locking-and-unlocking apparatus according to any one of the aspect of this disclosure, the rectifier circuit may include: a rectifier diode having an anode connected to the first connecting line and a cathode connected to the power source terminal of the human detection IC via a protective resistance, and a smoothing capacitor connected at one end to the power source terminal of the human detection IC and at the other end to a GND terminal of the human detection IC.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle opening-and-closing member locking-and-unlocking apparatus comprising:
    an antenna including a series resonance circuit having a resonance capacitor and an antenna coil connected in series and an impedance regulating resistance connected in parallel to the antenna coil, the resonance capacitor side being connected in parallel to a first connecting line, the antenna coil side being connected to a second connecting line, and the antenna transmitting authentication information for locking and unlocking a vehicle opening-and-closing member to a portable device carried by a user of the vehicle by resonance with an antenna drive signal output from an Electronic Control Unit (ECU) via the first connecting line and the second connecting line;
    a human detection IC configured to detect contact to a human detecting area on the vehicle opening-and-closing member by the user by operating with the antenna drive signal as power source when the antenna is driven and thus a direct current power source voltage is not supplied from the ECU via the first connecting line; and
    a rectifier circuit configured to AC/DC convert the antenna drive signal and supply the converted signal to the human detection IC,
    wherein the impedance regulating resistance is divided into a first voltage dividing resistance and a second voltage dividing resistance and a divided voltage obtained by dividing the antenna resonance voltage with the first voltage dividing resistance and the second voltage dividing resistance is output to a power source terminal of the human detection IC via a voltage dividing rectifier diode, and
    an anode of the voltage dividing rectifier diode is connected between the first voltage dividing resistance and the second voltage dividing resistance of the impedance regulating resistance, and a cathode of the voltage dividing rectifier diode is connected to the power source terminal of the human detection IC.

2. The vehicle opening-and-closing member locking-and-unlocking apparatus according to claim 1,
    the human detection IC detects a driving state of the antenna on the basis of a value of the divided voltage.

3. The vehicle opening-and-closing member locking-and-unlocking apparatus according to claim 1,
    wherein the resonance capacitor of the antenna is divided into a first resonance capacitor and a second resonance capacitor,
    one end of the first resonance capacitor is connected to the first connecting line, the other end of the first resonance capacitor is connected to one end of the second resonance capacitor, the other end of the second resonance capacitor is connected to one end of the antenna coil, and the other end of the antenna coil is connected to the second connecting line, and
    the impedance regulating resistance is connected in parallel to the second resonance capacitor and the antenna coil connected in series to each other.

4. The vehicle opening-and-closing member locking-and-unlocking apparatus according to claim 1,
    wherein the resonance capacitor of the antenna is divided into the first resonance capacitor and the second resonance capacitor,
    one end of the first resonance capacitor is connected to the first connecting line, the other end of the first resonance capacitor is connected to one end of the antenna coil, the other end of the antenna coil is connected to one end of the second resonance capacitor, and the other end of the second resonance capacitor is connected to the second connecting line, and
    the impedance regulating resistance is connected in parallel to the second resonance capacitor and the antenna coil connected in series to each other.

5. The vehicle opening-and-closing member locking-and-unlocking apparatus according to claim 1,
    wherein a resistance value R of the impedance regulating resistance is determined to satisfy the following relationship:

$$Z_1=j\omega L+(R\times 1/j\omega C)/(R+1/j\omega C) I_{IC}=Z_1/(Z_1+Z_{IC})\times I_{AC}$$
$$W_{IC}=I_{IC}\times V_{AC}$$

where $Z_{IC}$ is an impedance value of the human detection IC including the rectifier circuit, C is a capacitance value of the resonance capacitor, L is an inductance value of the antenna coil, ω is a frequency of the antenna drive signal, $V_{AC}$ is a voltage value of the antenna drive signal, and $I_{AC}$ is a current value of the antenna drive signal so that a power value $W_{IC}$ required by the human detection IC is supplied to the human detection IC.

6. The vehicle opening-and-closing member locking-and-unlocking apparatus according to claim 1,
    wherein the rectifier circuit includes:
        a rectifier diode having an anode connected to the first connecting line and a cathode connected to the power source terminal of the human detection IC via a protective resistance, and a smoothing capacitor connected at one end to the power source terminal of the human detection IC and at the other end to a GND terminal of the human detection IC.

\* \* \* \* \*